United States Patent Office 3,043,650
Patented July 10, 1962

3,043,650
PROCESS FOR DYEING CELLULOSE WITH REACTIVE DYESTUFFS
Jacques Wegmann, Basel, and Josef Renggli, Riehen, Switzerland, assignors to Ciba Corporation, a corporation of Delaware
No Drawing. Filed Mar. 26, 1959, Ser. No. 801,985
Claims priority, application Switzerland Mar. 28, 1958
11 Claims. (Cl. 8—54.2)

It is known that polyhydroxylated fibrous materials, such as cotton, can be dyed with advantage by fixing on the material by the action of an alkali and heat a reactive dyestuff, that is to say an organic dyestuff capable of entering into combination with cellulose.

The present invention is based on the unexpected observation that the fixation can be carried out practically without the application of heat by reacting a polyhydroxylated fibrous material, such as natural or more especially regenerated cellulose, at room temperature or at most a slightly raised temperature in the moist state with the reactive dyestuff in the presence of an acid-binding agent having in aqueous solution a more alkaline reaction than trisodium phosphate.

As reactive dyestuffs there are to be understood organic dyestuffs which are capable of being chemically fixed on the material by the action of heat. As organic dyestuffs of this kind there are used those which are capable of reacting with the material under the conditions of process, for example, owing to the presence of an epoxy-group, an ethylene-imine or ethylene-imide group, a double bond in $\alpha{:}\beta$-position relatively to a —CO— or —SO$_2$— group or of a labile substituent. There may be mentioned above all organic dyestuffs which contain an ethylene-imine group, an acryl group, especially an acrylylamino group, a vinyl-sulfone group or a labile substituent capable of splitting off easily with the taking over of the electron pair of the bond, one or more such labile substituents being present in the dyestuff molecule, but not more than one being present in a triazine ring.

As labile substituents capable of splitting off with the taking over of the electron pair of the bond, there may be mentioned, for example, aliphatically bound sulfonyloxy groups (including, of course, sulfuric acid ester groups), for example, an aliphatically bound

HO—SO$_2$—O— group or a halogen atom, especially an aliphatically bound chlorine atom. These labile substituents are advantageously present in the $\gamma$- or $\beta$-position of an aliphatic radical which is bound to the dyestuff molecule directly or through an amino group or a —SO$_2$— group or to the nitrogen atom of a carboxylic acid amide group or of a sulfonic acid amide group. In those dyestuffs which contain as a labile substituent a halogen atom, this exchangeable halogen atom may be present in an aliphatic acyl radical, for example, in an acetyl group or in the $\beta$-position of a propionyl group or advantageously in a heterocyclic radical, advantageously a monohalogenated heterocyclic ring. In this preferred form of the process dyestuffs are advantageously used which contain a labile chlorine atom bound to a heterocyclic ring, for example, to a pyrimidine or phthalazine ring or more especially to a triazine ring. There may be mentioned, for example, dyestuffs which contain a 2-phenyl-4-chloro-1:3:5-triazine ring, and above all dyestuffs which contain a monochloro-1:3:5-triazine ring of the formula (1) 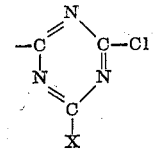

in which X represents a hydroxyl group that may be substituted or advantageously an amino group that may be substituted.

In addition to at least one labile substituent of the above kind the dyestuffs used in the process of this invention also contain at least one acid, and preferably strongly acid, group imparting solubility in water, such as an acylated sulfonic acid amide group, one or more further sulfuric acid ester groups, a carboxylic acid group or preferably a sulfonic acid group. There are advantageously used dyestuffs that contain more than one such group and they may belong to a very wide variety of classes, for example, stilbene dyestuffs, thioxanthone dyestuffs, azine dyestuffs, dioxazine dyestuffs, dyestuffs of the porphyrazine series such as the phthalocyanine dyestuffs, and above all acid anthraquinone dyestuffs and azo-dyestuffs, including metal-free and metalliferous mono- and polyazo-azo-dyestuffs. Especially good results are obtained with soluble dyestuffs which have no affinity or no pronounced affinity for cotton and contain at most one reactive halogen atom.

Many dyestuffs of the aforesaid kind are known or can be made by methods in themselves known, for example, by using dyestuff components which contain the aforesaid labile substituents or by incorporating these labile substituents or radicals containing such substituents in the dyestuff molecules by methods in themselves known after the dyestuffs have been made. Thus, by the reaction of an azo-dyestuff or anthraquinone dyestuff which contain a reactive —NH$_2$— group wtih trichloropyrimidine or with a primary condensation product of cyanuric chloride which contains two chlorine atoms and in place of the third chlorine atom of the cyanuric chloride an organic radical, there are obtained valuable condensation products which contain an exchangeable chlorine atom and are suitable for dyeing by the process of this invention. Those dyestuffs used in the process of this invention which contain a sulfonylated hydroxyl group can be made, for example, by reacting one molecular proportion of a dyestuff which contains a hydroxyalkyl group, for example, a sulfonic acid N-hydroxyalkylamide group, with an organic sulfonic acid halide, for example, tosyl chloride, benzene sulfonyl chloride or ethane sulfonyl chloride, or with concentrated sulfuric acid, in such manner that the hydroxyl group is acylated.

By using padding solutions or printing pastes containing such dyestuffs polyhydroxylated materials, especially cellulosic fibrous materials, which may be composed either of synthetic fibers, for example, of regenerated cellulose (viscose), or of natural fibers, for example, linen or more especially cotton or mixtures of such fibers or mixed fabrics, may be dyed on a padding machine or printed. There are advantageously used aqueous solutions of the aforesaid deystuffs which contain a non-electrolyte, such as urea or a lower carboxylic acid amide.

With solutions of this kind which also contain a more or less neutral, and preferably inorganic salt, such as an alkali metal chloride or sulfate, and, if desired, an acid-binding agent (preferably an inorganic acid-binding agent), which has a more alkaline reaction in water than trisodium phosphate, for example, an alkaline earth metal hydroxide, alkali metal metasilicate and/or alkali metal hydroxide, such as sodium hydroxide, the material to be dyed is impregnated advantageously in the cold or at a moderately raised temperature or, when no alkali is present, at a higher temperature, for example, of 60–80° C., and the impregnated material is squeezed in the usual manner. The material is advantageously squeezed to an extent such that it retains 0.5 to 1.3 times its original weight of dyestuff solution. When the dyestuff solution contains no alkali, it is necessary, after impregnating the material with the solution, to treat it with an alkaline solution, for example, a solution containing 15–25 grams of sodium hydroxide per liter, which solution preferably also contains a high concentration of salt.

The fixation of the dyestuffs on the impregnated material is carried out after the impregnation. For this purpose, for example, the material which has been impregnated with the dyestuff solution and with an alkali is maintained for a long time, for example, from 2 to 48 hours in a wet to moist condition, and, if desired, while being slowly rotated. At the end of this period the dyestuff will have become fixed on the material without it being necessary to subject the material to the action of heat. It will, of course, be understood that the reaction takes place more rapidly at room temperatures of 25° C. to 40° C. than at lower temperatures. However, by suitably prolonging the reaction period, it is possible to achieve adequate fixation at temperatures below 20° C., for example, down to 10° C., especially with dyestuffs that react easily, for example, those containing sulfonic acid chlorethylamide groups or monochlorotriazine groups, and particularly sulfuric acid esters of β-hydroxy-ethyl-sulfone dyestuffs. In the case of the most slowly reacting dyestuffs, for example, pyrimidine dyestuffs or sulfuric acid esters of sulfonic acid-N:β-hydroxyethyl-amides, smooth fixation can be achieved with a minimum consumption of heat at 30° C. to 40° C.

The process of the invention can be carried out with dyestuffs that are insufficiently stable in the presence of alkali, provided that care is taken to introduce the dyestuff solution and the solution of alkali into the padding trough separately by means of devices controlling the quantities of the solutions supplied, so that the dyestuff and alkali remain in the trough only a short time before the impregnation, because even dyestuffs that are most sensitive to alkali are considerably less sensitive on the fiber than they are in solution.

In a preferred form of the process of this invention the material is first impregnated only with the dyestuff solution with a very high degree of squeezing, and then the impregnated material, with or without being dried, is treated in an alkaline solution with a very low degree of squeezing. In order to prevent bleeding out the alkaline solution should have a rather high concentration of salt (100 to 200 grams of sodium chloride per liter) and often a rather high concentration of alkali. This form of the process has the advantage of making it unnecessary to take into account the sensitivity to alkali of the padding solution.

Measurements have shown that the concentrations of alkali and salt produced on the fiber in the process of this invention are more than twice as high as would be expected by pure calculation, because the electrolytes diffuse from the concentrated alkali-salt solution into the wet fibers due to the osmotic gradient. The process gives very good results, especially on fibers of regenerated cellulose in that the streakiness that can occur with such fibers is covered up.

By the process of this invention very valuable strong and generally very full dyeings and prints having excellent properties of wet fastness and a very good fastness to light are obtained on cellulosic materials, even with dyestuffs of the kind defined above which possess no affinity or no pronounced affinity for cotton.

In some cases it may be of advantage to subject the dyeings or prints obtained by the process to an after-treatment. Thus, for example, the dyeings are advantageously thoroughly rinsed and soaped, so that any incompletely fixed dyestuff is removed. When the dyestuffs used for producing the dyeings or prints by the process contain metallisable groups, they may be subjected to an after-treatment with an agent yielding a heavy metal, especially an agent yielding copper.

The following examples illustrate the invention, the parts and percentages being by weight. Although the dyestuffs are usualy referred to or shown in the form of the free acids, they are used in the form of alkali metal salts thereof.

*Example 1*

2 parts of the complex copper compound of the dyestuff of the formula

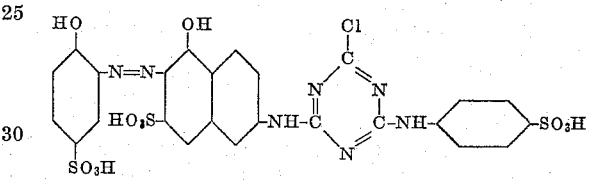

are mixed with 10 parts of urea and dissolved with heating in 85 parts of water. The solution is allowed to cool, 5 parts of 10 N-sodium hydroxide solution are added, and a viscose rayon fabric is impregnated with this solution, then squeezed to a weight increase of 75%, rolled up while still wet, and the roll is wrapped in a plastic foil to prevent the escape of moisture. The fabric is thus kept for 4 hours at room temperature (20 to 30° C.), rinsed for 15 minutes each in cold and boiling water, rinsed until clear and dried. A level ruby red dyeing is obtained which has good fastness to washing and light.

Similar good results are achieved when a cotton or spun rayon fabric is thus treated.

No change in the resulting dyeing is observed when the impregnating solution is left to itself for 4 hours before being used.

*Example 2*

4 parts of the dyestuff of the formula

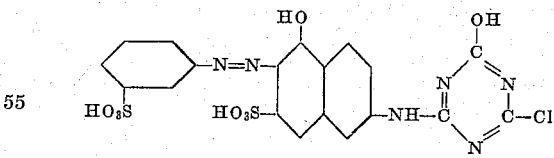

are dissolved with heating in 85 parts of water and after cooling 15 parts of 10 N-sodium hydroxide solution are added. A spun rayon fabric is impregnated with this solution, squeezed to a weight increase of 75%, the fabric is rolled up and the roll is wrapped in a plastic foil, and the whole is left to itself for 48 hours at room temperature. The fabric is then rinsed in cold and boiling water and dried. An orange dyeing is obtained which is fast to washing and light.

*Example 3*

2 parts of the dyestuff of the formula

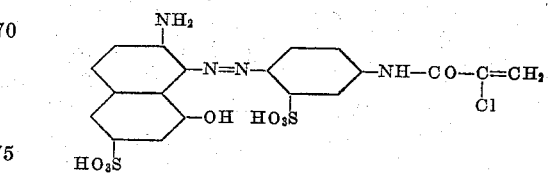

are dissolved in 98 parts of water, and 2 parts of 10 N-sodium hydroxide solution are added to the dyestuff solution. A viscose fabric is impregnated with this solution, squeezed to a weight increase of 100%, rolled up, left to itself for 4 hours and then rinsed in cold and boiling water. A red dyeing results which is fast to washing and light.

An equally good result is achieved when a fabric of mercerised cotton is thus treated.

When in the above example the sodium hydroxide solution is replaced by 2 parts of sodium metasilicate or 2 parts of lithium hydroxide, proceeding otherwise in identical manner, similar good results are achieved.

*Example 4*

2 parts of the dyestuff of the formula

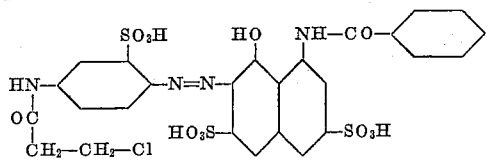

are dissolved in 95 parts of water by being raised to a short boil, and after cooling 5 parts of 10 N-sodium hydroxide solution are added to the dyestuff solution. A viscose fabric is impregnated with this solution, squeezed to a weight increase of 75%, rolled up and wrapped in a plastic foil, and the whole is allowed to stand at 20° C. for 48 hours. The fabric is then washed in cold and boiling water and dried. A brilliant red-violet dyeing results which has good properties of fastness to washing and light.

When in the above dyeing operation the dyestuff of the formula

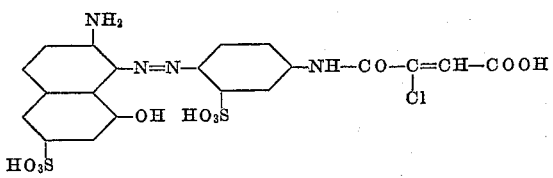

is used, a red dyeing is obtained which has similar good properties.

The dyestuff of the formula

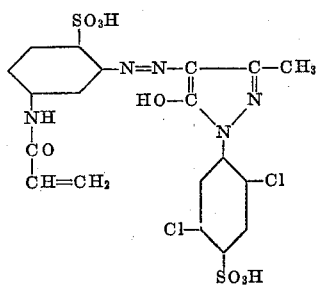

produces a yellow dyeing.

The dyestuff of the formula

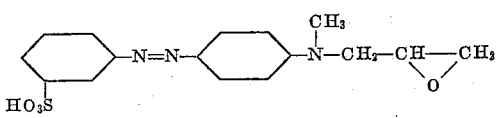

produces a reddish yellow dyeing.

The 1:2-chromium complex of the dyestuff mentioned in Example 1 produces a currant red dyeing, while the corresponding 1:2-cobalt complex gives a red-brown dyeing.

*Example 5*

2 parts of the dyestuff of the formula

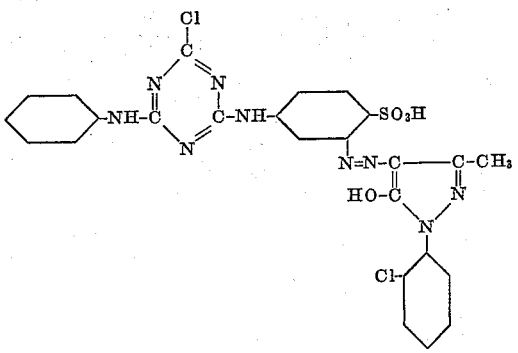

are dissolved with heating in 95 parts of water. After cooling, 5 parts of 10 N-sodium hydroxide solution and 2 parts of sodium chloride are added to the dyestuff solution which is then used to impregnate a cotton fabric. The fabric is squeezed to a weight increase of 60% and kept moist for 24 hours at room temperature, then washed in cold and boiling water and dried. A greenish yellow dyeing of good fastness to washing and light is obtained.

When the above dyestuff is replaced by 2 parts of the dyestuff obtained by condensing 1 molecular proportion of copper phthalocyanine tetrasulfonyl chloride with 1-2 molecular proportions of the condensation product of the formula

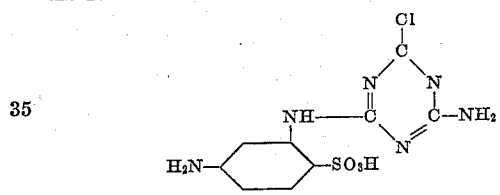

followed by hydrolysis of the unreacted sulfonyl chloride groups to sulfonic acid groups, proceeding otherwise in identical manner, a turquoise blue dyeing is obtained which is fast to washing and light.

By using the dyestuff of the formula

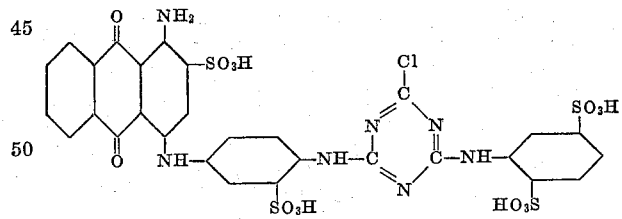

in the above example, a blue tint is obtained which is fast to washing and light.

*Example 6*

4 parts of the dyestuff of the formula

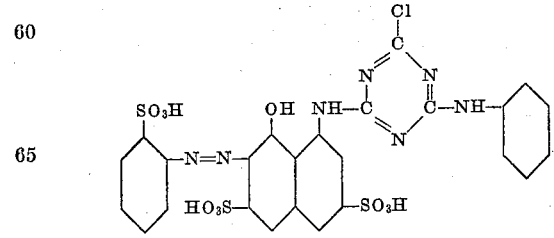

are dissolved with heating in 100 parts of water. The cooled solution is used to impregnate a fabric of mercerised cotton which is squeezed to a weight increase of 60%. Without intermediate drying the fabric is then impregnated with a solution of 20 parts of sodium chloride and 2.2 parts of sodium hydroxide (100%) in 110 parts of water, the roller pressure of the padder being adjusted so that the fabric absorbs another 30% of liquor. The fabric is then rolled up, wrapped in a polyethylene foil and left to itself for 12 hours at room temperature. The fabric is then thoroughly rinsed in cold and warm water, washed for 10 minutes in boiling water, rinsed until clear and dried. A brilliant red dyeing of good fastness to light and washing results.

*Example 7*

2 parts of the dyestuff of the formula

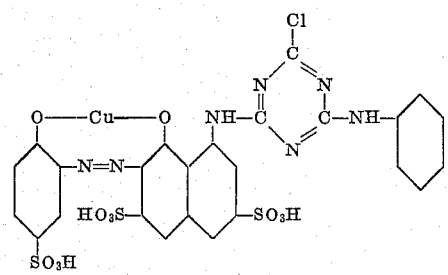

are dissolved in 100 parts of water. A fabric of mercerised cotton is impregnated with this solution (which has a temperature of 20 to 30° C.) in a manner such as to achieve a weight increase of 60%. The fabric is then further impregnated with a solution of 20 parts of sodium chloride, 2.2 parts of sodium hydroxide (100%) in 110 parts of water until the fabric has absorbed another 30% of liquor calculated from its dry weight. The fabric is rolled up, wrapped in a plastic foil, left to itself for 12 hours at 20 and 30° C., rinsed in cold and warm water, boiled in water for 10 minutes, rinsed and dried.

A level violet dyeing of good fastness to washing and light results.

*Example 8*

3 parts of the dyestuff of the formula

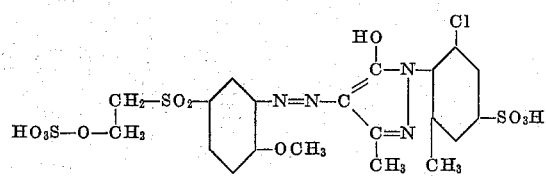

are dissolved in 100 parts of water and a fabric of mercerised cotton is impregnated with this solution and then squeezed to a weight increase of 60%. Without intermediate drying the fabric is then impregnated with the sodium chloride solution containing sodium hydroxide described in Example 7 and squeezed to an additional increase in weight of 30% calculated from the dry weight of the textile material. The fabric is rolled up, wrapped in a plastic foil and left to itself for 14 hours at room temperature. The sodium chloride and hydroxide are then thoroughly rinsed out and the fabric is boiled in water for 10 minutes, rinsed clear and dried.

A level, brilliant yellow dyeing of good fastness to light and washing results.

*Example 9*

4 parts of the dyestuff of the formula

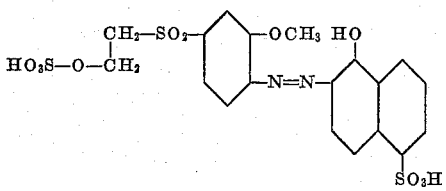

are dissolved in 100 parts of water. A fabric of viscose-spun rayon is impregnated with this solution and then squeezed to a weight increase of 85%. Without first drying the fabric is then impregnated with a solution of 20 parts of sodium chloride, 2.2 parts of sodium hydroxide (100%) in 100 parts of water and squeezed to an additional weight increase of 25% calculated from the dry weight of the fabric. The fabric is rolled up and wrapped in a plastic foil and left to itself for 12 hours at room temperature, then rinsed in cold and boiling water and dried. A level red dyeing is obtained which is fast to washing.

When the fabric is washed after having been kept for 8 hours, an equally handsome, but slightly paler dyeing is obtained.

*Example 10*

3 parts of the cobalt complex obtained from 1 atomic proportion of cobalt and two molecular proportions of the dyestuff of the formula

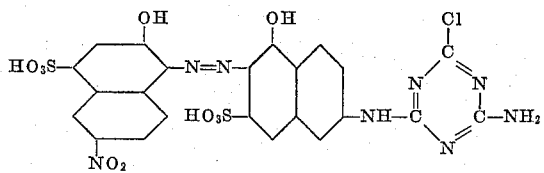

are dissolved in 100 parts of water. A fabric of viscose-spun rayon is impregnated with this solution and then squeezed to a weight increase of 80%. Immediately afterwards the fabric is further impregnated with an aqueous solution of sodium hydroxide and sodium chloride as described in Example 9 so that the additional weight increase amounts to 25% calculated from the dry weight of the fabric. The fabric is rolled up and wrapped in a plastic foil, allowed to stand for 24 hours at 25° C. The fabric is then thoroughly rinsed in cold and hot water, boiled in water for twice 10 minutes, rinsed and dried.

A currant red dyeing is obtained which is fast to washing and light.

Similarly good results are obtained by using the dyestuffs of the formulae

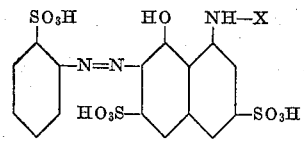

(in which X represents a dichloropyrimidine residue. The dyeing is red.)

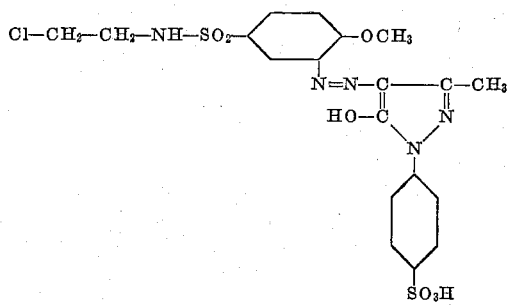

(Tint: yellow)

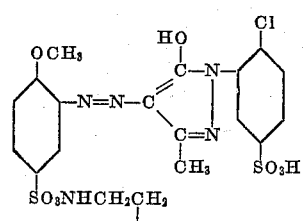

(Tint: yellow)

and keeping the fabric, rolled up in a plastic foil, for 24 hours at 35° C.

Example 11

2 parts of the dyestuff of the formula

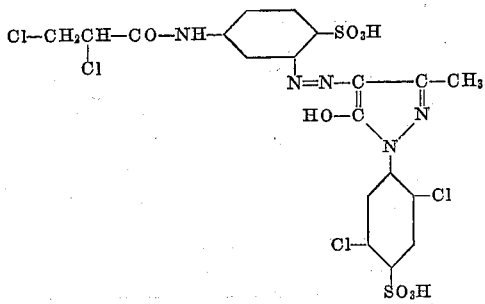

are dissolved in 100 parts of water, and immediately before use the solution is mixed with 5 parts of a 10 N-solution of sodium hydroxide solution. The mixture is used to impregnate a viscose rayon fabric which is then squeezed to a weight increase of 70%, rolled up, kept in the moist state for 4 hours at room temperature, and then thoroughly rinsed in hot and cold water.

A yellow dyeing is obtained which is fast to washing and light.

Similar good results are obtained with the following dyestuffs.

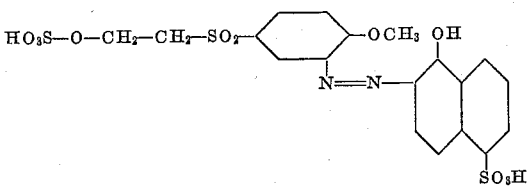

(Tint: red)

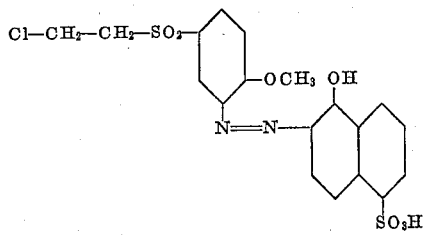

(Tint: red)

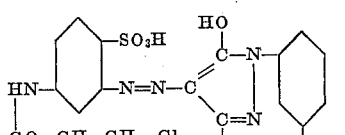

(Tint: yellow)

What is claimed is:

1. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble organic dyestuff containing a reactive substituent selected from the group consisting of the acid sulfuric ester group, the acrylamino group, the β-chloropropionylamino group, the β-chloroethylsulfone group, the β-chloroethylamide group, the dichloropyrimidine and monochloro-1:3:5-triazine groups; (2) mechanically removing excess impregnation-liquor; and (3) maintaining the resulting moist impregnated cellulosic fiber at a temperature of at most 40° C. for at least two hours.

2. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble organic dyestuff containing, as a reactive substituent, a monochloro-1:3:5-triazine radical; (2) mechanically removing excess impregnation-liquor; and (3) maintaining the resulting moist impregnated cellulosic fiber at a temperature of at most 40° C. for at least two hours.

3. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble organic dyestuff containing, as a reactive substituent, a dichloropyrimidine radical; (2) mechanically removing excess impregnation-liquor; and (3) maintaining the resulting moist impregnated cellulosic fiber at a temperature of at most 40° C. for at least two hours.

4. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble organic dyestuff containing, as a reactive substituent, an $$-SO_2CH_2CH_2OSO_3H$$

group; (2) mechanically removing excess impregnation-liquor; and (3) maintaining the resulting moist impregnated cellulosic fiber at a temperature of at most 40° C. for at least two hours.

5. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble organic dyestuff containing, as a reactive substituent, an $$-SO_2NHCH_2CH_2OSO_3H$$

group; (2) mechanically removing excess impregnation-liquor; and (3) maintaining the resulting moist impregnated cellulosic fiber at a temperature of at most 40° C. for at least two hours.

6. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble phthalocyanine dyestuff containing, as a reactive substituent, a monochloro-1:3:5-triazine radical; (2) mechanically removing excess impregnation-liquor; and (3) maintaining the resulting moist impregnated cellulosic fiber at a temperature of at most 40° C. for at least two hours.

7. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble anthraquinone dyestuff containing, as a reactive substituent, a monochloro-1:3:5-triazine radical, (2) mechanically removing excess impregnation-liquor; and (3) maintaining the resulting moist impregnated cellulosic fiber at a temperature of at most 40° C. for at least two hours.

8. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble azo dyestuff containing, as a reactive substituent, a monochloro-1:3:5-triazine radical; (2) mechanically removing excess impregnation-liquor; and (3) maintaining the resulting moist impregnated cellulosic fiber at a temperature of at most 40° C. for at least two hours.

9. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble phthalocyanine dyestuff containing, as a reactive substituent, a $$-CO-CH_2-CH_2Cl$$

group; (2) mechanically removing excess impregnation-liquor, and (3) maintaining the resulting moist impregnated cellulosic fiber at a temperature of at most 40° C. for at least two hours.

10. A process for dyeing cellulose which comprises: (1) impregnating, in impregnation-liquor, cellulosic fiber with a (a) acid-binding agent which in aqueous solution has a more alkaline reaction than trisodium phosphate and with (b) water-soluble phthalocyanine dyestuff containing, as a reactive substituent, an $$-SO_2-CH_2-CH_2Cl$$

group; (2) mechanically removing excess impregnation-liquor; and (3) maintaining the resulting moist impregnated cellulosic fiber at a temperature of at most 40° C. for at least two hours.

11. A process for dyeing cellulose which comprises: (1) impregnating, in impregnation-liquor, cellulosic fiber with (a) acid-binding agent which in aqueous solution has a more alkaline reaction than trisodium phosphate and with (b) water-soluble phthalocyanine dyestuff containing, as a reactive substituent, an $$-NH-CH_2CH_2Cl$$

group; (2) mechanically removing excess impregnation-liquor; and (3) maintaining the resulting moist impregnated cellulosic fiber at a temperature of at most 40° C. for at least two hours.

References Cited in the file of this patent
UNITED STATES PATENTS

| | | |
|---|---|---|
| 2,892,670 | Alsberg et al. | June 30, 1959 |
| 2,892,671 | Alsberg et al. | June 30, 1959 |
| 2,892,674 | Sause et al. | June 30, 1959 |
| 2,892,828 | Stephen | June 30, 1959 |
| 2,892,829 | Stephen | June 30, 1959 |
| 2,892,830 | Stephen | June 30, 1959 |
| 2,895,785 | Alsberg et al. | July 21, 1959 |
| 2,914,531 | Staeuble et al. | Nov. 24, 1959 |
| 2,935,506 | Heslop et al. | May 3, 1960 |
| 2,949,467 | Staeuble | Aug. 16, 1960 |